July 13, 1965    J. V. KAHLBAU ETAL    3,194,589
VIBRATION ISOLATING PIPE COUPLING
Filed July 19, 1963

INVENTORS
JERRY V. KAHLBAU
FREDERICK O. BOHLS
BY
ATTORNEYS

United States Patent Office 3,194,589
Patented July 13, 1965

3,194,589
VIBRATION ISOLATING PIPE COUPLING
Jerry V. Kahlbau and Frederick O. Bohls, Austin, Tex., assignors, by mesne assignments, to the United States of America as represented by the Secretary of the Navy
Filed July 19, 1963, Ser. No. 296,410
1 Claim. (Cl. 285—49)

The present invention relates to a coupling member adapted to interconnect a pair of rigid pipes or tubes with a pressure-tight seal and, more particularly, to such a coupling member which effectuates a vibration-isolating coupling in that it provides relatively small stiffness in the axial direction for decoupling longitudinal vibration present in one or both of the interconnected pipes or tubes.

A variety of methods previously have been employed for reducing the mechanical stiffness of a short portion of a pressurized pipe with the aim of achieving a vibration isolation or damping in the pipe system. On prior method is the inclusion in the pipe system of corrugated bellows with the use of various anchoring systems so that the bellows section can resist the thrust force of the pressurized fluid in the pipe system. A principal disadvantage of this method is that metal bellows joints require elaborate anchoring systems to prevent over-stressing or failure (of the bellows joint) due to the thrust force of the fluid pressure inside the pipe system. In addition, metal bellows, so used, require flow fairings to reduce turbulence at high flow rates of the fluid in the pipe system and the bellows walls are subjected to fatigue failure.

Another prior method for achieving the subject vibration isolation is the use of telescoping slip joints which permit relative motion between the two pipes to be interconnected. In order to achieve effective sealing action with this method the friction force is necessarily large and this places an intrinsic limit upon the usefulness of "slip joints" as vibration isolating elements in a piping system.

Still another previously-employed method for attaining vibration isolation in a piping system is the use of lengths of flexible hose as pipe-interconnecting elements. These flexible hose elements, which consist of lengths of fabric or metal-braid-reinforced rubber or corrugated metal hose, function well as pipe vibration isolation elements at low or moderate pressures, but such hoses capable of withstanding high pressures are necessarily of heavy construction and at high internal pressures they become quite stiff with the result that their vibration isolation capability is largely lost.

Summarized briefly, the present invention provides a pipe coupling which both effectuates a pressure-tight (fluid) seal at the point of coupling and acts as a vibration isolating element between the sections of pipe being coupled thereby. In general, the coupling member comprises: (1) a longitudinally-extending housing which forms a tubular conduit, (2) an annular piston-like member which is slidably received by the longitudinally-extending housing and whose tubular inner surface coacts with the housing conduit to provide a continuous fluid passageway, and (3) a number of axially-compliant seals located intermediate the housing and the slidable piston-like member both for effectuating the necessary pressure-tight sealing action between these elements and for permitting vibration-decoupling relative movement between the housing and the piston-like member, which are both formed to solidly connect to the adjacent respective pipe portions which are to be interconnected by the coupling member. A significant feature of the coupling member is its employment of the pipe system fluid pressure to balance-off the axial thrust force that the pressurized fluid in the piping system would otherwise detrimentally impose upon the coupling structure. By so doing, the present pipe coupling achieves a "pressure-balancing" of both sides of the coupling member to eliminate changes in compression loads on the seals which would follow changes in system pressure (of the fluid carried by the piping system). Another significant feature of the coupling member defined herein is the structure of the axially compliant seals thereof, each of which consists of a series stack of O-rings held in operative position by a plurality of metal confining rings.

Among objects of importance of the present invention are:
To provide a vibration-isolating pipe coupling;
To provide a vibration-isolating pipe coupling suitable for use with a piping system carrying high-pressure fluid;
To provide a means for decoupling longitudinal vibrations in pipe walls;
To provide a pipe coupling of the type having pressure-tight seals wherein changes in compressive loads on the various pressure-tight seals due to changes in the piping system pressures are eliminated;
To provide a pressure-balanced pipe coupling capable of vibration-isolation;
To provide a vibration-isolating pipe coupling whose degree of axial stiffness is easily varied.

Other objects and many of the attendant advantages of this invention will be readily appreciated as the same becomes better understood by reference to the following detailed description when considered in conjunction with the accompanying drawing in which.

Figure 1:
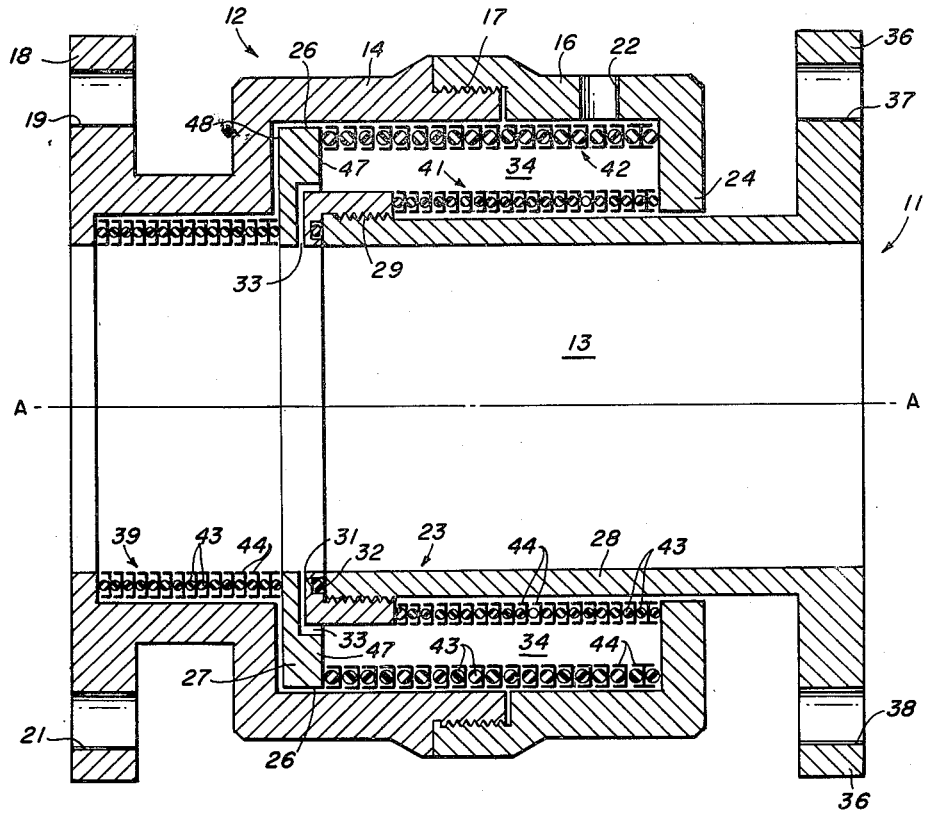
FIG. 1 is a longitudinal sectional view of the coupling member.

Looking generally from left to right at the coupling member, which is generally designated with the numeral 11, there is seen a longitudinally-extending housing 12 whose structure is symmetrically disposed about the axis A—A, which also defines the longitudinal axis of the substantially circular cross-section passageway 13 which serves as the operative fluid-conveying conduit through the coupling member 11. Housing 12 consists of two portions 14 and 16, respectively, which are joined together by complementary threaded sections as seen at 17. The left hand housing portion 14 is provided with an appropriately bored mounting flange 18 by means of which this portion 14 of the housing 12 can be attached to one of the pipes to be interconnected by the coupling member 11. Holes 19 and 21 are two of the bores in the flange 18. The right-hand portion 16 of the housing 12 is provided with a combination vent and Spanner-wrench hole 22. This hole 22 passes through the housing 12 to vent the area therebelow to atmosphere and also serves to permit mating insertion thereinto of the head-end of a conventional Spanner wrench for the purpose of rotating the housing portion 16 either to lock said right-hand housing portion 16 onto the left-hand housing portion 14 or to back off said right-hand housing portion 16 from said left-hand housing portion 14, as desired.

Slidably mounted within housing 12 is a generally longitudinally-disposed annular piston-like member 23 whose structure is symmetrical with respect to the axis A—A and which is constrained against possible radial movement at one longitudinal location by the annular abutment 24 (of housing 12) which slidably mates with piston-like member 23 and at another longitudinal location by the sliding contact of its radially-extending abutting portion 26 with the opposed longitudinally-extending internal surface of housing 12. As shown in FIG. 1, piston-like member 23 is constructed of two main portions 27 and 28 joined together by complementary mating threads at 29. Portion 27 is formed with an annular groove 31 therein which accommodates a conventional O-ring 32 for the purpose of effecting a fluid-tight seal between these portions 27 and 28 of the piston-like member 23. This portion 27 is also provided with a plurality of passageways 33 therein, each of these passageways 33 running from the main fluid conduit passageway 13 to an annularly-disposed chamber 34 which is located, as shown, intermediate housing 12 and piston-like member 23. Like housing 12, piston-like member 23 also is formed at its longitudinally-outermost end with an appropriately-bored flange 36 by which it can be attached to the second of the two pipes to be interconnected by said coupling member 11. Holes 37 and 38 are representative bore holes in this flange 36.

Figure 2:
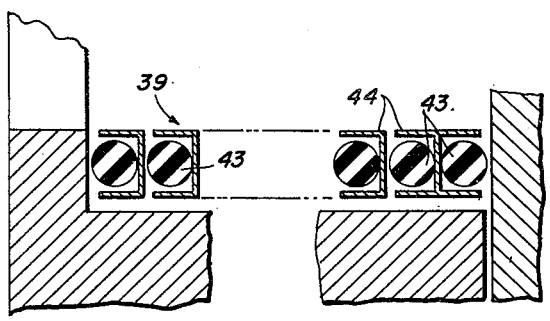
FIG. 2 is an enlarged-scale view of a "complaint seal unit" employed in the coupling member.

The balance of the pipe coupling member 11 consists of three compliant seal units designated respectively as 39, 41 and 42. Each compliant seal unit consists of a series stack of elastomeric O-rings 43 in combination with a plurality of annular confining rings 44. These annular confining rings 44 which have cross-sectional shapes as seen in FIG. 1 and more clearly in the expanded-scale showing of a compliant seal unit portrayed in FIG. 2, are positioned with each confining ring 44 sandwiched in between adjacent O-rings 43 in the series stack of O-rings. It will be noted that all of the confining rings 44 in an operatively-positioned compliant seal unit are ⊐-shaped with the exception of the last confining ring in the combined stack of O-rings 43 and confining rings 44. This last confining ring is shown in each of the compliant seal units as ⊥-shaped for the obvious purpose of confining both the last and second-last O-rings of the stack, in order that there be no "solid-structure" confining ring between the last O-ring in the given stack and the coupling portion said O-ring is meant to abut. Elongate axially-compliant seal units 41 and 42 which are positioned, as shown in FIG. 1, in chamber 34 and in longitudinally-extending sandwiched position between respective vertically-extending portions of housing 12 and slidable piston-like member 23, tend to resist, with a resiliently damping action, rightwardly-directed movement of piston-like member 23 relative to housing 12. In like fashion, compliant seal unit 39 will dampingly resist leftwardly-directed movement of this piston-like member 23 relative to housing 12. In addition, these three compliant seal units 39, 41, and 42 effect fluid-tight seals between the housing 12 and the piston-like member 23 along the lines defined by the various O-ring stacks of these respective compliant seal units. The various O-rings 43, their confining rings 44 and the axial length provided for the entire assembly of the given compliant seal unit are proportioned so that the various compliant seal units both perform fluid-sealing actions between the housing 12 and the piston-like member 23 (for the purpose of performing this fluid-sealing action the individual O-rings of the various compliant seal units are of such number, for the given length provided for the particular seal unit, that they are always under some degree of compression) and present resilient "buffers" on both sides of piston-like member 23 to absorb longitudinal vibratile relative movement from either housing 12 or piston-like member 23 so that such relative movement is not significantly passed to the other principal element of the pipe coupling member 11. This, of course, will effectuate decoupling of longitudinal vibration of the respective pipes to which each of these principal elements of the coupling member (i.e., housing 12 and piston-like member 23) are fixedly attached. The coupling member 11 also affords some reduction in the bending and torsion stiffness between the pipes it interconnects. Adjacent confining rings 44 of a compliant seal unit do not touch each other except in cases of unusually large relative longitudinal displacement between housing 12 and piston-like member 23.

The fluid passing through the piping system, of which the coupling member 11 is a component, will generate, by its static pressure acting for instance at such points as where there are bends in the system or changes in direction of the fluid flow, an axial thrust. The plural passageways 33, formed in piston-like member 23 and which interconnect annular chamber 34 with the main fluid-conveying passageway 13 of coupling member 11, enable the fluid pressure in chamber 34 to be equalized with the fluid pressure present in the main fluid-conducting passageway 13, for fluid passes freely from the main fluid-conveying passageway 13 via these passageways 33 into the annular chamber 34. With vent-and-Spanner wrench hole 22 connected to atmosphere, atmospheric pressure will be present on that side of piston-like member portion 27 which is opposite from chamber 34. With atmospheric pressure applied to one side of the "piston" (portion 27) and system pressure to the other side thereof, the vector sum of the forces due to the pressures on the two sides of the "piston" (portion 27) will produce a resultant force which opposes the axial thrust force normally associated with fluid pressure inside a closed pipe or tube. The force exerted upon the "piston" (portion 27) by the atmospheric pressure will, for most fluid pressures encountered by the piping system, be insignificant compared to the thrust exerted upon the "piston" (portion 27) by the fluid pressure within chamber 34, so that, for practicable purposes, the fluid pressure within chamber 34 can be considered the only really significant pressure acting upon the "piston" (portion 27). The effective area of the "piston" (portion 27) will be adjusted to produce a force to substantially equalize the usual axial thrust force to be encountered. Thus it can be seen that the axial thrust forces are automatically equalized (by system pressure) in the coupling member 11.

With the coupling member 11 thus "pressure balanced" to "eliminate" axial thrust, the opposing compliant seal units, which are located on opposite sides of the substantially vertically-extending portion 27 of longitudinally-shiftable piston-like member 23, are free to perform their vibration isolating function. The opposing compliant seal units represented by compliant seal unit 39, on the one hand, and compliant seal units 41 and 42, on the other hand, will exert no net compliant-seal-induced thrust on piston-like member 23 when the piston-like member 23 is in its "pressure balanced" equilibrium position and is also receiving no longitudinal vibrational movement from either of the pipes interconnected by coupling member 11. When longitudinal vibratile movement is transmitted to the coupling member 11 by either or both of the pipes interconnected thereby, this vibratile movement will substantially be lost in the relative movement of housing 12 and piston-like member 23, which movement is dampingly resisted by the compliant seal units which continually act to restore piston-like member 23 to its equilibrium position after the coupling member 11 has accepted a given vibratile movement. The individual characteristics of the various elastomeric O-rings which comprise a given compliant seal unit can, of course, be varied to produce the desired degree of stiffness or resiliency in the stack of O-rings which comprise the given compliant seal unit. The character, size and number of the individual O-rings which comprise the various compliant seal units can be varied so that the resilient thrust upon piston-like member 23 from compliant seal unit 39 "balances off" the combined opposing thrusts on the same piston-like member 23 from compliant seal units 41 and 42, when piston-like member 23 is in its "equilibrium position."

FIG. 2 shows compliant seal unit 39 on an enlarged scale to display a representative compliant seal unit structure. Except for the size (and character) and number of the O-rings and of the confining rings associated therewith all of the compliant seal units are alike in general configuration and combination of their components.

Obviously many modifications and variations of the present invention are possible in the light of the above teaching. For instance, any suitable means may be employed for attaching coupling member 11 to the pipes to be interconnected thereby. The O-ring-confining rings 44 might be made with a more intricate section profile than that shown, so that any O-ring material extruded would have to pass through a labyrinth between rings. These are but several examples. It is intended to cover all changes and modifications of the embodiment set forth above which do not constitute departures from the spirit and scope of the invention.

What is claimed is:

Vibration-isolating-pipe coupling apparatus for connecting a pair of longitudinally aligned fluid passage pipes comprising:

a female member adapted to be connected at its outer end to one of said pair and provided at its inner free end with a radially-inwardly-extending flange, a male member fitted into said female member and provided at its interior end with a radially-outwardly-extending flange, the exterior end of the male member being adapted to be secured to the other of said pair and said male member having its interior surface longitudinally aligned with the interior surfaces of said pair of pipes, a pair of radially-spaced stacked O-ring sealing and vibration decoupling assemblies extending and compressed between said male and female member flanges, a third stacked O-ring sealing and vibration-decoupling assembly extending and compressed between the radial flange of said male member and said outer end of the female member, said outer end of the female member being formed with a radial flange disposed to abut said third assembly and said last-mentioned flange being disposed for maintaining said third assembly with its radially inward surfaces aligned with the inner surfaces of said pair of pipes, a fluid passage extending through said male member flange into the radial space between said pair of O-ring assemblies, said O-ring assemblies each being formed of a plurality of stacked O-rings each formed of an elastomeric material and a plurality of stacked U-shaped casings each having its legs and web partially encompassing one of said O-rings, one of said O-rings at one end of each assembly projecting outwardly of its casing into abutment with one of said radial flanges, and each of the remaining O-rings projecting outwardly of its casing into abutment with an adjacent casing whereby a fluid-tight seal is created by the assembly, and vent means for exposing of the fluid free interior surfaces of said coupling apparatus to atmosphere, said O-ring assemblies being sufficiently flexible and compressible for decoupling vibrations to which the apparatus is subjected and said fluid pressure acting on said radial flanges for counter balancing the axial thrust of fluid in said pipes and apparatus.

References Cited by the Examiner

UNITED STATES PATENTS 1,248,275 11/17 Crowe.
2,348,833 5/44 Miller _____ 285—228
2,859,978 11/58 Brimhall.

FOREIGN PATENTS 4,709 1893 Great Britain.

CARL W. TOMLIN, *Primary Examiner.*